INVENTOR.
JEANETTE L. RUBRICIUS

United States Patent Office 2,989,681
Patented June 20, 1961

2,989,681
PROTECTIVE SYSTEM FOR ELECTRICAL APPARATUS
Jeanette L. Rubricius, 85—35 Midland Parkway, Jamaica, N.Y.
Filed Oct. 20, 1958, Ser. No. 768,373
4 Claims. (Cl. 318—481)

The present invention relates to protective systems for electrical apparatus and particularly to means for isolating electrical apparatus operating at line voltage from the ambient atmosphere and for interrupting the supply of current to such apparatus upon any failure of the isolating means to function effectively. It also makes provision for a safe low voltage circuit to be used remotely to energize sensing elements.

In certain applications of electrical apparatus, such as motors, meters, oscilloscopes, and test equipment wherein they are employed in explosive, volatile gaseous environments, serious accidents may occur through electrical short-circuiting causing explosive reactions and consequential damage to the apparatus and attending personnel. It is, therefore, of paramount importance that such equipment be rendered explosion-proof to guard against the accidental ignition of the gaseous environment in the event of failure of the equipment to operate properly.

Since equipment employed in electrical measuring and testing must as a general rule employ external controls and external sensing elements to measure conditions, such as temperature, pressure, and conductivity, safeguards must be taken to insure that the voltage of these external controls and sensing elements be maintained at a low enough level to prevent arcing even in the event of short-circuiting. The usual accepted value for the voltage impressed on the external components is in the order of approximately 8 volts. Since the majority of electrical equipment, such as servo-motors, oscilloscopes, and amplifiers utilize a voltage of typically 117 volts A.C., it is evident that where both an electric motor, oscilloscope, or amplifier and ancillary sensing means are employed in the same operation and energized by the same power supply, some safeguards are necessary in utilizing the equipment which is energized by the 117 volt power source, as well as to safeguarding against a voltage rise in the ancillary sensing device which may be located in the hazardous area.

An object of the present invention is to produce a method and means for rendering different types of electrical measuring and testing equipment inherently safe when used in an environment containing explosive gases which might be ignited from accidental arcing in that portion of the equipment which is supplied with current at the higher potential and to safeguard against a potential rise in any normally safe low voltage external circuit.

The broad concepts of the present invention are directed to a system for isolating electrical apparatus from the ambient environment comprising a gas-tight container housing the apparatus to be isolated including gas-tight conductor means for supplying electric current from an external power source to electrical apparatus in the container and pressure responsive means in the container connected between the power source and the electrical apparatus to interrupt the supply of current to the apparatus upon alteration of the pressure in said container by a predetermined amount.

In a typical embodiment of the invention, a pressurized container is employed to house an electric motor and its associated direction control signal amplifier which are energized by the ordinary high line voltage. A step-down transformer arrangement suitable for energizing the associated low voltage components of the system are likewise housed within the container. The associated input and output leads of the system are adapted to extend through the wall of the container within pressure tight seals. A pressure sensitive device is disposed within the container and connected between the power source and the components to be energized.

During normal operation of the system, the pressure sensitive device allows the passage of current therethrough; however, upon a variance in pressure from the predetermined level, such as would occur with leakage, the device will function to immediately interrupt the current to the contained electrical equipment.

In operation, low voltage is generated in the isolated high voltage area by a step-down transformer. This low voltage is further isolated from the power supply by means of a second transformer containing the same number of turns in both the primary and secondary windings. A ground is interposed between the step-down transformer and the isolation transformer and a fuse is interposed between the A.C. source and primary winding of the step-down transformer. Hence, any inadvertent short circuiting of the primary to the secondary windings in the step-down transformer would not be transmitted to the isolation transformer because of the intermediate ground. Also a sudden surge in current utilization caused by short circuiting would open the circuit by melting the fuse interposed between the power supply and the primary winding of the step-down transformer.

Certain other objects and advantages will be manifested from the following description of the invention and the drawings, in which.

Figure 1:
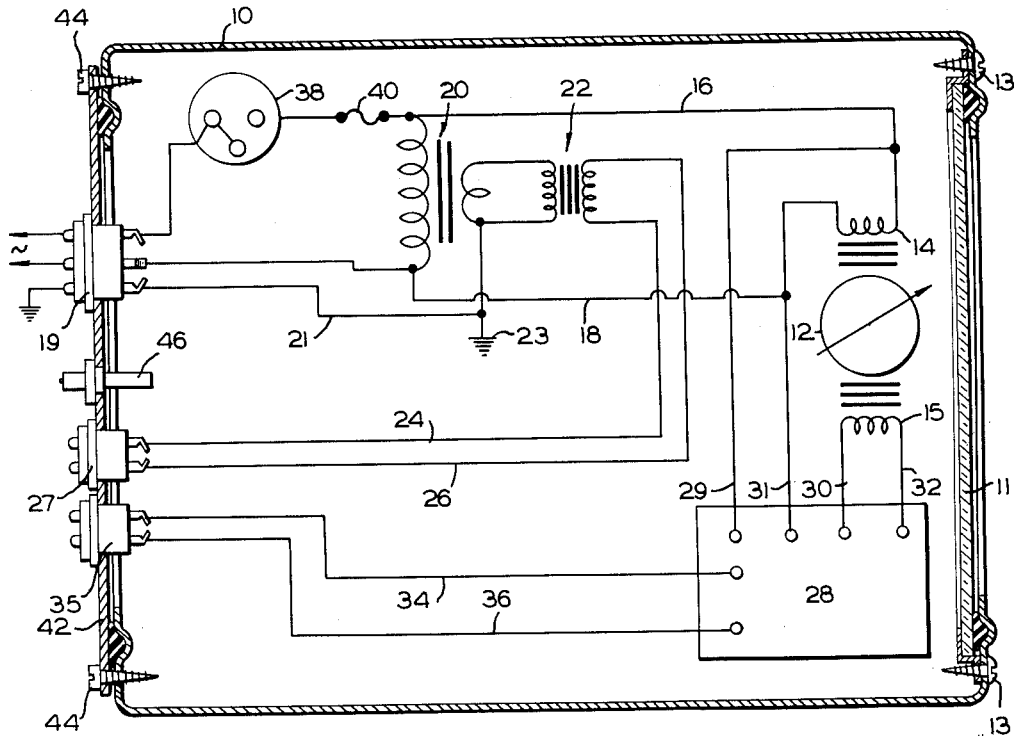
FIGURE 1 is a diagrammatic illustration of an embodiment of the invention.

There is shown in FIG. 1 a diagrammatic illustration of one embodiment of the invention wherein the components to be isolated are contained within container 10 which may be equipped with a window 11 of glass or other transparent material. A pressure-tight sealing means is employed around the peripheral marginal edge of the window 11 and is secured by suitable threaded fasteners 13. An electric servo-motor 12 which has field windings 14 and 15, is disposed within the container 10 and connected to a remote source of line power through leads 16 and 18 which extend through the container wall through a hermetically sealed plug 19.

A step-down transformer 20, disposed within the container 10, has its primary winding connected across the power leads 16 and 18. The secondary or low voltage side of the transformer 20 is connected to the primary winding of an isolation transformer 22. The other side of the isolation transformer 22 is connected to an auxiliary circuit through leads 24 and 26 which extend through the wall of the container 10 through a pressure-tight seal 27.

It will be noted that the primary winding of the isolation transformer 22 is connected to ground potential through the conductor 21 which extends through container wall through the pressure-tight seal 19. Also, the primary winding of the transformer is grounded to the container 10 as diagrammatically illustrated at 23. Any failure such as a short circuit in the step-down transformer 20 cannot be transmitted through the isolation transformer 22 because of the intermediate ground connection.

An amplifier 28, disposed within the container 10, is connected to the power supply through leads 29 and 31 which, in turn, are connected to the power supply leads 16 and 18. The output side of the amplifier 28 is coupled to the field winding 15 of the servo-motor 12 through conductors 30 and 32. The amplifier 28 is further connected to a signal source, remote from the container 10, through conductors 34, 36 which extend through the wall of the container 10 through a sealing plug 35. In certain applications, it may be found advantageous to cable the electrical conductors together into groups such as a high voltage group and a low voltage group and pass them through the wall of the container in groups rather than individually.

A pressure relay switch 38 is suitably connected in the power line 16. The switch 38 is of the type that is normally closed when the pressure is of a certain predetermined amount and will open upon any variation from that pressure, to thereupon immediately interrupt the power to the contained electrical equipment.

A fuse element 40 may be employed in the primary winding circuit of the transformer 20 to protect the electrical equipment within the pressure container 10 so that upon occurrence of a surge current of a dangerous magnitude, the fuse will effectively open the circuit.

In order to provide for access to the components housed within the container 10, a removable side wall 42 is secured to the container by fastening means 44. The side wall 42 is adapted to receive seal elements 19, 27, and 35 and also an evacuating air valve 46. The valve 46 may be attached to a pump for effecting the desired pressure condition within the interior of the container 10. It must be understood that in certain applications of the present invention it may be desired to evacuate the container 10 while in most of the preferred applications, the pressure within the container 10 is higher than the ambient atmosphere. This arrangement is preferred so that explosive gases cannot enter the container and so that interruption of the A.C. supply would occur in the event of breakage or leakage before the explosive gases could enter.

Figure 2:
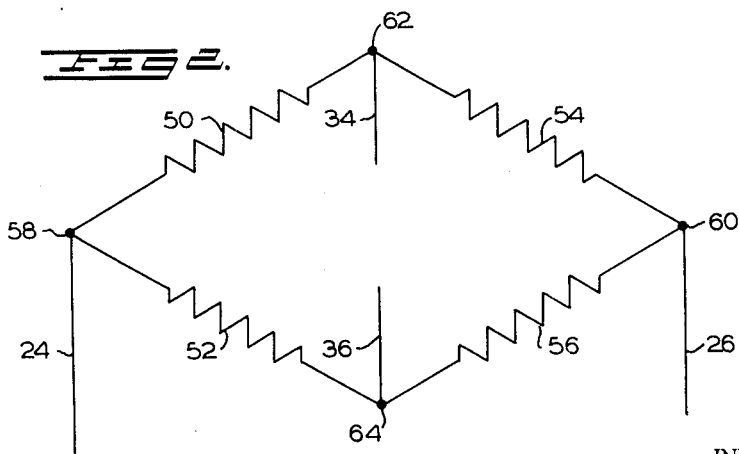
FIGURE 2 is an illustration of a circuit which may be utilized in conjunction with the apparatus of FIGURE 1.

We will assume for purposes of illustration that the above described arrangement is to be employed to measure the changes in the resistance of one arm of a Wheatstone bridge circuit. An illustrative arrangement is shown in FIGURE 2 wherein there is a Wheatstone bridge circuit including resistance elements 50, 52, 54, 56 which form the arms of the bridge circuit. The conductors 24 and 26 which lead from the isolation transformer 22, shown in FIGURE 1, are connected at points 58 and 60, respectively, of the bridge. Manifestly, the current delivered through conductor 24 to the bridge at point 58 divides into two parts; one part taking the path composed of the resistances 50 and 54, and the other part taking the path made up of resistances 52 and 56. The currents come together again at point 60 and return to the transformer 22 through the conductor 26. Conductors 34 and 36 are arranged to bridge the two branches of the Wheatstone bridge from points 62 and 64, respectively.

The values of resistance elements 50, 52, 54 and 56 are selected such that there is no difference of potential between points 62 and 64 and thereby the bridge is "balanced." In the balanced condition there is no flow of current through the conductors 34 and 36 which are connected to the amplifier 28.

*Operation*

Let us now consider the operation of the apparatus illustrated in FIGURE 1. In an exemplary application of the apparatus, an indicator is secured to the armature of the servo-motor 12 which could, for example, indicate the changes in the resistance of one of the resistance elements of the Wheatstone bridge circuit shown in FIGURE 2.

The bridge circuit is suitably energized by the transformer 22 which effectively senses the stepped down voltage of the transformer 20. The output of the isolation transformer 22 is coupled to the bridge circuit through conductors 24 and 26. When the bridge is in a balanced condition, the energization of the field winding 14 from the remote power supply will not effect any rotation of the armature of the motor 12. However, when an unbalance of the bridge circuit occurs, a signal proportional to the unbalance is fed to the input of the amplifier 28 through conductors 34 and 36. This signal is amplified and, in turn, fed to the field winding 15 of the servo-motor 12 through the conductors 30 and 32 and is effective to cause the motor armature to rotate and thereby simultaneously move the associated indicator which may be so calibrated to indicate the change in resistance experienced by the arm of the Wheatstone bridge.

In the event a change in the pressure within the container 10 such as might occur during accidental breakage, the pressure responsive relay 38 will open, thereby completely isolating the contained electrical equipment from the power supply. Consequently, the apparatus is immediately rendered completely safe. Manifestly, if explosive gases entered the container 10 and consequentially came into contact with the electrical components, an explosion might occur resulting in serious damage to the components and also injury to attending personnel. However, these explosive gases cannot enter the container 10 without a resultant variation of the pressure within the container 10 which variation would be sensed by the pressure responsive relay 38 thereby immediately isolating the electrical apparatus from its source of power.

I claim:

1. A system for isolating electrical apparatus from the ambient environment comprising a gas-tight container housing the apparatus to be isolated, a servo-motor disposed within said container, said servo-motor having at least two field windings, gas-tight conductor means for supplying electric current to one of said field windings from an external power source, a step-down transformer means within said container having its primary winding connected to said power source, an isolation transformer means having its primary winding within said container connected to the secondary winding of said step-down transformer means and having its secondary winding connected to an ancillary external circuit through gas-tight conductor means, an amplifier within said container connected between the external circuit and the other of said field windings of said motor, means for connecting said amplifier to said external power source, and pressure responsive means within said container connected between said external power supply and the electrical apparatus including said motor, step-down transformer, isolation transformer, and amplifier whereby the supply of current to said apparatus is interrupted upon alteration of the pressure in said container by a predetermined amount.

2. The invention claimed in claim 1 wherein said container comprises a removable side wall portion for providing access to the interior thereof.

3. The invention claimed in claim 2 wherein said container is further provided with valve means communicating with the interior of said container for effecting the desired pressure condition therewithin.

4. The invention claimed in claim 1 wherein said pressure responsive means comprises a switching relay with normally closed contacts.

References Cited in the file of this patent
UNITED STATES PATENTS 2,674,708    Husted _____ Apr. 6, 1954
2,793,328    Kuhn et al. _____ May 21, 1957